United States Patent
Eramian

(10) Patent No.: US 9,230,272 B1
(45) Date of Patent: Jan. 5, 2016

(54) SMART LINE ROUTING USING WIRELESS BEACONS

(71) Applicant: EBAY INC., San Jose, CA (US)

(72) Inventor: David Edward Eramian, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 14/340,069

(22) Filed: Jul. 24, 2014

(51) Int. Cl.
*G06K 5/00* (2006.01)
*G06Q 30/02* (2012.01)
*H04W 4/04* (2009.01)
*H04W 4/02* (2009.01)

(52) U.S. Cl.
CPC ........... *G06Q 30/0281* (2013.01); *H04W 4/028* (2013.01); *H04W 4/043* (2013.01)

(58) Field of Classification Search
CPC ........... G06K 5/00; G06K 7/10; G06K 19/00; G06Q 40/00; G06Q 30/00; G06Q 20/00; G06Q 10/00; G06F 17/00; G06F 19/00; G07D 11/00
USPC ................... 235/380, 487, 379, 472.01, 377; 705/28, 26.61, 17, 26.8, 14.58, 27.1
See application file for complete search history.

(56) References Cited

U.S. PATENT DOCUMENTS

| | | | |
|---|---|---|---|
| 2003/0220835 A1* | 11/2003 | Barnes, Jr. | G06Q 10/1053 705/14.36 |
| 2004/0181467 A1* | 9/2004 | Raiyani et al. | 705/28 |
| 2008/0290182 A1* | 11/2008 | Bell et al. | 235/61 V |
| 2013/0282533 A1* | 10/2013 | Foran-Owens et al. | 705/27.1 |
| 2013/0297422 A1* | 11/2013 | Hunter et al. | 705/14.58 |
| 2013/0317944 A1* | 11/2013 | Huang | G01S 5/0252 705/26.61 |
| 2014/0337151 A1* | 11/2014 | Crutchfield | 705/17 |
| 2015/0012385 A1* | 1/2015 | Bahnsen et al. | 705/26.61 |
| 2015/0026006 A1* | 1/2015 | Jackson et al. | 705/26.8 |

* cited by examiner

*Primary Examiner* — Edwyn Labaze
(74) *Attorney, Agent, or Firm* — Haynes and Boone, LLP

(57) ABSTRACT

There are provided systems and methods for smart line routing using wireless beacons. A merchant may set up a wireless beacon throughout a storefront or retail location for the merchant. The beacons may connect to a user's device and provide check-in services to the user. Based on the connections between the user's device and the wireless beacons, information about the user's behavior in the merchant location may be determined. The information may correspond to items/services the user may purchase and an amount of items/services the user may purchase. Using this information and a payment instrument the user utilizes to complete a transaction for the items/services, and expected time for the user to complete a checkout and payment to the merchant may be determined. The expected time can be used to direct the user to a checkout line that minimizes a wait time for each line.

20 Claims, 6 Drawing Sheets

US 9,230,272 B1

SMART LINE ROUTING USING WIRELESS BEACONS

TECHNICAL FIELD

The present application generally relates to smart line routing using wireless beacons and more specifically to determining a user's path through a merchant location using wireless beacons to make decisions on an expected checkout time for the user and subsequent users.

BACKGROUND

At various merchant locations, such as a merchant's retail store, a user may browse items and/or services for sale from the merchant and select various items/services for purchase from the merchant. These items/services may be grouped in areas together, such as a produce or bakery of a shopping market or a computers or televisions section of an electronics store. Based on the amount of items/services purchased, the user may spend a different amount of time completing a checkout and payment. For example, purchasing one bag of apples may be very quick; however, purchasing enough vegetables, meat, condiments, and hamburger buns for a barbeque may take a considerably larger amount of time. Moreover, certain items/services may take longer to purchase by nature of the type of item/service. While purchasing soft drinks for a barbeque may be accomplished quickly, it may take longer to purchase alcohol for a party due to checking identification to verify age, completing a more expensive purchase, or retrieving items that are under security precautions. Moreover, payment methods may cause users to spend different amounts of time completing a payment. However, merchants merely guide users to checkout lines without determining how long the user may take to checkout. Thus, these checkout lines may not be optimized to increase user throughput and create a better user experience.

Figure 1:
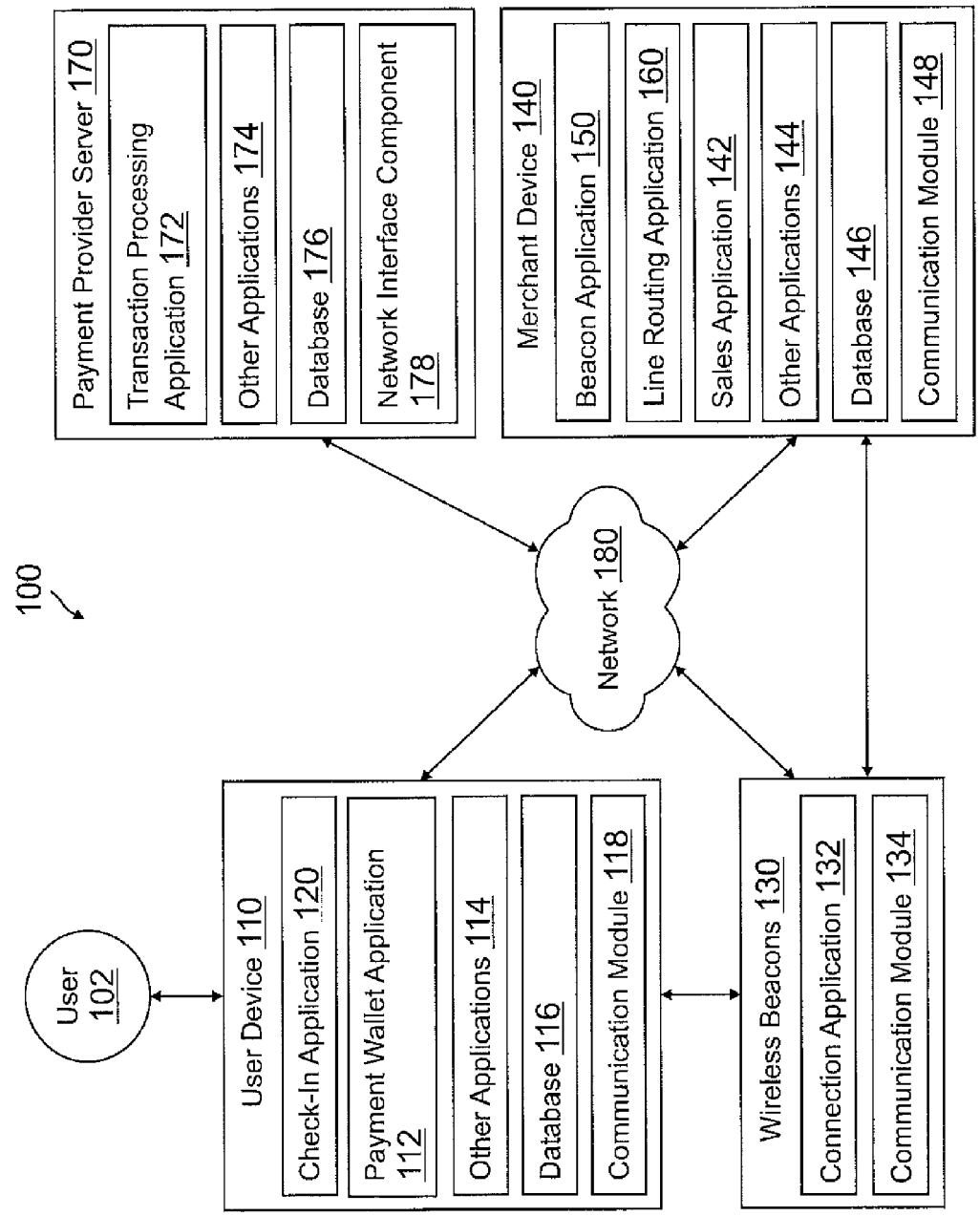
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide smart line routing using wireless beacons. Systems suitable for practicing methods of the present disclosure are also provided.

Various locations may provide short range wireless communications with a device, such as through beacons using one or more of Bluetooth Low Energy (BLE) communication protocol, LTE Direct communication protocol, WiFi communication protocol, etc. These beacons may be set up at a location and communicate with devices to alert users of check-in services through their device. The beacons may provide additional functionality, such as establishing a connection with a server entity to complete transactions, including payment services. The beacons may communicate with the devices directly, including information stored in the beacons. The beacons may also communicate with a device attached to, or in communication with, the beacon, such as a device of a merchant.

A merchant may offer smart line routing using the aforementioned wireless beacons at a merchant location. A merchant location may correspond to a retail store, a shopping market, a mall location, or other physical location where a user, such as a consumer or purchaser, may visit to purchase items. Owners of the merchant locations may utilize short range wireless beacons at the merchant location to communicate with a device of the user. For example, the short range wireless beacons may be established throughout the merchant location, such as sub-locations having a type or category of items to purchase. The beacons may employ BLE, LTE Direct, WiFi, or other communications that emit a signal receivable by the user's device. The communication may include an identifier for the beacon, the user, the merchant, and/or a payment provider that provides payment services between the user and the merchant.

A user may set up a user device to passively monitor for BLE, LTE Direct, WiFi, or other communication signals from the beacon. When the user device detects the signal and verifies the one or more identifiers, both the user device and the beacon may ramp up in power and establish a connection, where the connection may further enable the user device to communicate with the merchant. The beacon may also provide information to a merchant device for the merchant, such as an amount of time the user device stays connected to the beacon, actions the user takes with the user device while connected to the beacon, and other tracking information. The beacon may be connected to a networked device at the merchant location, or the beacon may include network functionality to communicate with other devices and/or servers. Thus, the beacon enables the user device to establish a connection, communicate check-in information (e.g., an identifier for the user), and/or initiate a check-in with the merchant. The check-in may be completed automatically when the user device is in range of the beacon, or may be completed after prompting the user to check-in when the user device is in range of the beacon.

Once the merchant establishes the wireless beacons throughout the merchant location, the merchant may register the location for each of the wireless beacons. As previously discussed, a location for a wireless beacon may correspond to a sub-location within the merchant location. For example, a sub-location in a shopping market may correspond to a bakery section, a deli section, a produce section, or other section of the market. In another example, a sub-location of an electronics store may correspond to a television section, a gaming section, a computing section, etc. Thus, a sub-location may identify a part of the merchant location. Based on the items and/or services available in the sub-location, an expected purchasable item/service for the user may be determined if the user visits the section and their user device connects to the wireless beacon for the section. For example, if the user visits a bakery section of a market and their user device connects to the wireless beacon in the section, it may be determined that the user is purchasing baked goods. A sub-location may be further subdivided, such as a cake/pastry area of a bakery section. Thus, more than one wireless beacon may correspond to a sub-location and may be used to subdivide the sub-location in various embodiments. As the user travels through the merchant location, the user may form one or more connections with the wireless beacons throughout the merchant location. Based on the number and type of connections, purchasing information about the user may be determined. For example, by tracking the connections, the tracking information may show the user has only visited the bakery, has visited a bakery, produce, and butcher location, or other location information. Thus, the user may only be purchasing baked goods, or may be purchasing baked good, produce, and meats, respectively.

In addition to using the area that the user visits in the store to make determinations as to the items and/or services the user may purchase, an amount of time spent in the area may also determine a type or quantity of items and/or services that the user may purchase. For example, a user visiting a television section of a merchant location for less than 10 minutes may not likely purchase a television. Thus, if the user later travels to a video gaming section and then wishes to checkout, it is likely the user is only purchasing a video game or video game system. However, if the user spends a long time in the television section and then travels to a checkout, the user may be purchasing a television. Similarly, if the user spends a short time in a produce section, the user may only be purchasing one or two fruits or vegetables, whereas a user that spends 10-15 minutes in a produce section may be purchasing a substantial amount of fruits and/or vegetables.

Using the information about the user taken from the connections between the user device and the wireless beacons at the merchant location, an expected checkout time may be determined for the user. The expected checkout time may correspond to an estimated or predicted amount of time that it may take the merchant to ring up the items/services the user wishes to purchase (e.g., scan and determine a total for the selected items/services) and an amount of time for the user to provide a payment instrument, the merchant and/or a payment provider to process the payment, and for completion of the payment (including providing the merchant and/or user a transaction history/receipt). The expected checkout time may be determined based on the amount of items to purchase and the type of items. For example, purchasing one soda at a merchant location may be quickly accomplished, whereas purchasing 30+ items of various bakery, deli, and produce goods, may take a substantially longer amount of time. Moreover, if grocery items include alcohol or medications, age verifications, prescription verifications, or other processed information may increase an expected checkout time. Additionally, the expected checkout time may be affected by previous purchases by the user. If the user has previously purchased or often purchases certain items, such as diapers, hair products, etc., and visits the same area of a store, it may be determined that the user will again be purchasing the same products. The user may also establish a shopping list on a user device or cloud service, which the user may view and interact with at the merchant location. Thus, items input to the shopping list may also be used to determine the expected checkout time for the user. If the user crosses items off the shopping list while at the merchant location, it may be determined the user is purchasing that item. Thus, a user device or cloud service may provide shopping list information used to determine an expected checkout time.

In various embodiments, the payment method of the purchase may affect the expected checkout time. Thus, items like large electronic purchases or purchases with an extendable store credit may take longer to accomplish than small cost items. The expected checkout time may also depend on the payment instrument the user may utilize, has indicated the user will utilize, or has utilized in the past. For example, cash, credit card, check, store credit accounts, or payment account with a payment provider may each be processed in different amounts of item. Thus, the expected checkout time may depend on the payment instrument.

Using the expected checkout time for the user, the user may be routed to a specific checkout line or route at the merchant location. The user may further be routed to a specific checkout line based on other users and an expected wait time for the checkout line. For example, the merchant may monitor the checkout line by utilizing information about the expected checkout time for each user in the checkout line, the number of users in the checkout line, the items/services the user is purchasing in the checkout line, or other information obtainable about the checkout line. Using the checkout line's expected wait time information with the expected checkout time for users at the merchant location, the merchant may intelligently route the users to a line that expedites the user's checkout process and/or reduces congestion and wait times in each checkout line for the merchant. The merchant may then route further users to the same or different lines based on the expected checkout time for the first user. Thus, the expected checkout time for the first user affects the line routing and expected checkout times for subsequent users.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user device 110, wireless beacons 130, a merchant device 140, and payment provider server 170 in communication over a network 180. User 102, such as a consumer or other shopper at a merchant location, may arrive at the merchant location and establish a connection with one or more of wireless beacons 130 at the merchant location while user 102 is selecting items/services for purchase. Once user 102 is ready to checkout and pay for the items/services, merchant device 140 may determine an expected checkout time for user 102 based on the connections between user device 110 and wireless beacons 130. Merchant device 140 may then instruct user 102 to utilize a specific checkout line at the merchant location. Additionally, payment provider server 170 may provide payment services between user device 110 and merchant device 140.

User device 110, wireless beacons 130, merchant device 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 180.

User device 110 may be implemented using any appropriate hardware and software configured for wired and/or wireless communication with wireless beacons 130, merchant device 140, and/or payment provider server 170. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a check-in application 120, a payment wallet application 112, other applications 114, a database 116, and a communication module 118. Check-in application 120, payment wallet application 112, and other applications 114 may correspond to processes, procedures, and/or applications executable by a hardware processor, for example, a software program. In other embodiments, user device 110 may include additional or different software as required.

Check-in application 120 may be used by user 102 of user device 110 to establish a connection with one or more of wireless beacons 130, established throughout a merchant location for merchant device 140 (e.g., a grocery store, retail location, storefront, etc.). Check-in application 120 may be configured to connect to one or more of wireless beacons 130 in order to enable merchant device 140 to track user 102's movements through the merchant location and other behaviors of user 102 while in the merchant location (e.g., an amount of time spent in a location of the merchant location). In this regard, check-in application 120 may receive short range wireless communications from wireless beacons 130 at the merchant location and transmit information to wireless beacons 130, including check-in information for a check-in process with merchant device 140 (or payment provider server 170 if payment provider server 170 provides check-in services) that associates user 102 with the location corresponding to wireless beacons 130. For example, the location for one or more of wireless beacons 130 may correspond to a sub-location within the merchant location, such as a produce aisle of a grocery store, an electronics section of a retail store, a bedding section of a home goods store, or other sub-area having a description or item/service type within a larger merchant location. In such an example, wireless beacons 130 may be range limited to correspond only to the sub-location, and a plurality of other wireless beacons may be distributed throughout the merchant location, each capable of uniquely connecting to user device 110. Wireless beacons 130 may be set to be range limited to the sub-locations, or may be limited to the room by virtue of merchant location (e.g., walls, dividers, spacing, etc.). Thus, check-in application 120 may transmit information to one or more of wireless beacons 130 when user 102 is nearby the one or more of wireless beacons 130 enabling merchant device 140 to determine where user 102 is within the merchant location. In turn, merchant device 140 may make determinations, assumptions, and intelligent decisions about an expected checkout time for user 102 to complete a transaction at the merchant location, as will be explained in more detail herein.

Check-in application 120 may further correspond to an application utilized by user device 110 with merchant device 140 to complete a check-in for the merchant location corresponding to wireless beacons 130. The check-in with merchant device 140 may correspond to a process to log in to a user account of user 102 with merchant device 140 (or payment provider server 170 if payment provider server 170 provides check-in services). In other embodiments, the check-in may provide and/or verify the identity of user 102, including transmission of an identifier for user 102 and/or user device 110. The check-in may be completed over network 180 with merchant device 140. In such embodiments, check-in application 120 may correspond more generally to a browser application configured to communicate with merchant device 140.

Check-in application 120 may execute in the background of an operating system of user device 110 and be configured to establish connections, using communication module 118 of user device 110, with one or more of wireless beacons 130. The connection may be established with or without user input from user 102. For example, wireless beacons 130 may broadcast a token, such as a universally unique identifier (UUID), for reception by check-in application 120, as will be explained in more detail herein. Check-in application 120 may utilize communication module 118 of user device 110 to receive the token from one or more of wireless beacons 130. If check-in application 120 acknowledges the UUID as identifying wireless beacons 130, merchant device 140, and/or payment provider server 170 (e.g., if check-in application 120 determines the UUID corresponds to a request to complete a check-in), check-in application 120 may transmit an identifier corresponding to user 102 and/or user device 110 back to the one or more of wireless beacons 130 transmitting the first identifier. Check-in application 120 may utilize communication module 118 of user device 110 to communicate with one or more of wireless beacons 130 (e.g., over near field communication, Bluetooth, Bluetooth Low Energy, radio, infrared, LTE Direct, or other connection). The identifier from user device 110 may include, be transmitted with, concatenated with, or otherwise bundled with the identifier received from the one or more of wireless beacons 130 transmitting the first identifier. In other embodiments, different information may be transmitted to wireless beacons 130, such as a name or other personal information for user 102, a loyalty account for user 102 with the merchant, etc. Thus, the information transmitted to wireless beacons 130 does not need to be utilized to process and/or complete a check-in with merchant device 140 in all embodiments.

Once a connection is established with one or more of wireless beacons 130, user device 110 may be checked-in with merchant device 140 if user 102 has not previously been checked-in. The check-in process may then associate user 102 with the one or more of wireless beacons 130 used to connect to user device 110. For example, a merchant for merchant device 140 may previously have established and registered wireless beacons 130 as located in sub-locations throughout a merchant location for the merchant. Thus, merchant device 140 may be informed that user 102 is within the sub-location based on the connection between user device 110 and one or more of wireless beacons 130 located in the sub-location. As previously discussed, in other embodiments, a check-in need not be processed and/or completed to associate user 102 with the sub-location and/or the merchant location. Thus, other connections and data transfers to one or more wireless beacons 130 at the sub-location may be sufficient to associate user 102 with the sub-location and/or merchant location.

In various embodiments, check-in application 120 may display information received from merchant device 140 to user 102. For example, when user device 110 connects to one or more of wireless beacons 130 located at a merchant location for merchant device 140, merchant device 140 may determine that user 102 is at the merchant location. Furthermore, if wireless beacons 130 are established in sub-locations of the merchant location, merchant device 140 may determine a sub-location that user 102 has visited. As will be explained in more detail herein, merchant device 140 may further determine a time user 102 spends in the sub-location, other sub-locations user 102 visits, and an expected checkout time to process and/or complete a transaction for items/services selected by user 102 at the merchant location. Using the aforementioned information and other information available to merchant device 140, merchant device 140 may determine a checkout line that user 102 may utilize to optimize user/customer throughput and speed when checking out and paying for items/services at the merchant location. For example, merchant device 140 may optimize wait times in each checkout line by placing numerous users with 1-3 item purchases in one line, while the 2 users with 15 or more item purchases in another line, as will be explained in more detail herein. The information for the checkout line, route, or path for user 102 may be presented to user 102 in check-in application 120.

Moreover, merchant device 140 may present user 102 with determined, estimated, or intelligently decided information based on the tracking, shopping, and/or expected purchasing information determined for user 102 through connections between user device 110 and wireless beacons 130. For example, based on the information gathered about user 102 using wireless beacons 130, an expected checkout time and an optimized checkout line for user 102 may be determined and presented to user 102 through an application interface of check-in application 120. However, if the expected checkout time far exceeds an actual or predicted checkout time that user 102 knows or believes it will take user 102 to checkout, user 102 may ignore the checkout line determined and communicated to user 102, or may enter further information to check-in application 120 to refine the expected checkout time for a better estimate of the amount of time to check out by user 102. Thus, the checkout line provided to user 102 may be altered using input by user 102.

Additional parameters and/or information that affect the expected checkout time and resulting optimized checkout line for user 102 may be presented to user 102 through check-in application interface 120. For example, a number and/or type of items/services predicted to be purchased by user 102 using information gathered by wireless beacons 130 may be presented by check-in application 120. Additionally, past behavior, such as transaction histories, items/services in the transaction histories, and checkout times for completion of the transaction histories may be presented by check-in application 120. These transaction histories may further present the payment instrument selected by user 102, or a payment instrument for user by user 102 may be selected using payment wallet application 112 or entered to check-in application 120. In order to prevent abuse by user 102 when providing input to reduce an expected checkout time, such as a number of items/services selected for purchase by user 102, type of items/services selected for purchase by user 102, payment instrument used by user 102, and/or past checkout times by user 102, an abuse system may be implemented by merchant device 140 that prevents user 102 from altering one or more parameters affecting the expected checkout time, as will be explained in more detail herein. Thus, if user 102 is determined to be abusing the alteration of the parameters, check-in application 120 may limit and/or prevent user 102 from altering the aforementioned parameters when presented to user 102 in an application interface of check-in application 120.

Payment wallet application 112 may be used, for example, to provide a convenient interface to permit user 102 to select payment options and provide payment for items and/or services. For example, payment wallet application 112 may be implemented as an application having a user interface enabling the user to enter payment options for storage by user device 140, provide payment to a merchant (e.g., through merchant device 140), and complete a transaction for the items and/or services using payment provider server 170. In certain embodiments, payment wallet application 112 may correspond more generally to a web browser configured to view information available over the Internet or access a website corresponding to a payment provider.

Payment wallet application 112 may be configured to provide payment to merchant device 140. In this regard, payment wallet application 112 may correspond to an application that may provide an interface where user 102 may view a purchase order for items requested by user 102. Additionally, user 102 may generate a payment request for the purchase order to the merchant. The payment request may instruct payment provider server 170 to provide payment for the purchase order to the merchant. Additionally, the payment request may denote a payment instrument that payment provider server 170 may utilize to provide the payment to the merchant. Payment wallet application 112 may correspond to a dedicated application for payment provider server 170 (e.g., a specific device application) or may correspond to a browser application.

The payment request may correspond to a token including the selected payment instrument for user 102. The payment instrument may include an account identifier, payment card, bank account, etc. Once the payment request is generated, user 102 may authorize the payment request for transmission to payment provider server 170 in order to effectuate a payment to the merchant. Payment wallet application 112 may transmit the payment request to payment provider server 170 with an identifier for the merchant in order to complete the payment to the merchant. In other embodiments, payment wallet application 112 may transmit the payment request as a token with a payment instrument and identifier for user 102 to merchant device 140 for completion by the merchant.

Payment wallet application 112 may provide payment for items using a user account with the payment provider, such as payment provider server 170. Payment wallet application 112 may include cross-linking, allowing user 102 to identify a user account through an identifier for a separate user account (e.g. identifying a user account through a debit card account number and vice versa). Payment wallet application 112 may further include options to store transaction histories for purchased items, such as receipts, for later use. Thus, payment wallet application 112 provides an interface enabling user 102 to provide proof of purchase to the merchant.

In various embodiments, one or more features of check-in application 120 and/or payment wallet application 112 may be incorporated in the same application so as to provide their respective features in one application.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 180, or other types of applications. Other applications 114 may also include email, texting, voice and IM applications that allow a user to send and receive emails, calls, texts, and other notifications through network 180. In various embodiments, other applications 114 may include financial applications, such as banking, online payments, money transfer, or other applications associated with payment provider server 170. Other applications 114 may include browser, social networking, and/or mapping applications, which may also be used in conjunction with check-in application 120 and/or payment wallet application 112. Other applications 114 may contain software programs, executable by a processor, including a graphical user interface (GUI) configured to provide an interface to the user.

User device 110 may further include database 116 which may include, for example, identifiers such as operating system registry entries, cookies associated with check-in application 120, payment wallet application 112, and/or other applications 114, identifiers associated with hardware of user device 110, or other appropriate identifiers, such as identifiers used for payment/user/device authentication or identification. Identifiers in database 116 may be used by a payment/credit provider, such as payment provider server 170, to associate user device 110 with a particular account maintained by the payment/credit provider. Database 116 may include user device tokens and/or encryption keys, including an encryption key of wireless beacons 130, merchant device 140, and/or payment provider server 170. Database 116 may include identifying information for tokens enabling check-in application 120 to identify wireless beacons 130, merchant device 140, and/or payment provider server 170 when receiving a corresponding check-in token.

User device 110 includes at least one communication module 118 adapted to communicate with wireless beacons 130, merchant device 140, and/or payment provider server 170. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacons 130 using short range communications, such as Bluetooth Low Energy, LTE Direct, radio frequency, infrared, Bluetooth, and near field communications.

Wireless beacons 130 may be maintained, for example, by a merchant for merchant device 140 and/or payment provider server 170. Wireless beacons 130 may be implemented using any appropriate hardware and software configured for wireless communication with merchant device 110. For example, in one embodiment, wireless beacons 130 may be implemented as a dongle device including a hardware processor and a communication module, for example, connected to device at the location of user 104. Wireless beacons 130 may also be implemented as a device incorporated within a personal computer (PC), a smart phone, laptop/tablet computer, and/or other types of computing devices capable of transmitting and/or receiving data. Wireless beacons 130 may also act as a stand-alone device including a processor, communication module, and/or network interface component configured to communicate with merchant device 140 and/or payment provider server 170. Although wireless beacons 130 are described as a plurality of wireless beacons set up at sub-locations within a merchant location for merchant device 140, in various embodiments, wireless beacons 130 may correspond to a single wireless beacon established at the merchant location and/or a sub-location within the merchant location.

Wireless beacons 130 may be located at a physical location corresponding to merchant device 140 (e.g., a merchant location, such as a grocery store, shopping market, retail location, merchant storefront, etc.). Each of wireless beacons 130 may be established at sub-locations located throughout the merchant location. For example, one or more of wireless beacons 130 may be established in an area corresponding to a specific type of item/service or items/services available at the merchant location (e.g., food type, personal service type, consumer good type, etc.). Each of wireless beacons 130 may further be range limited to connect to device within the sub-location. Wireless beacons 130 of FIG. 1 contains processes, procedures, and/or applications executable by a hardware processor, for example, a software program, configured to interact with user device 110, merchant device 140, and/or payment provider server 170. Thus, regardless of the implementation of wireless beacons 130, as discussed above, each of wireless beacons 130 utilize a check-in application 132 and a communication module 134. In other embodiments, wireless beacons 130 may include additional or different software and devices as required.

Check-in application 132 may correspond to an application for transmitting requests to establish a connection between a device (e.g., user device 110) and one of wireless beacons 130. The requests may be unique to each of wireless beacons 130 and form a connection with only the matching one of wireless beacons 130. Thus, wireless beacons 130 may utilize short range wireless communications (e.g., BLE, LTE Direct, WiFi, etc.) of wireless beacons 130 to transmit the requests to establish a connection, including an identifier such as a Universally Unique Identifier (UUID). If user device 110 receives a request to establish the connection with wireless beacons 130 and responds with an identifier for user 102/user device 110 (potentially including the UUID and other information necessary to effectuate a check-in for user 102), wireless beacons 130 to ramp up in power and create a connection between user device 110 and one of wireless beacons 130.

Each of wireless beacons 130 may uniquely transmit the request to establish the connection with wireless beacons 130 as a short range wireless communication (e.g. a BLE protocol communication) including a "wake up" process for check-in application 120 of user device 110 and/or a token for the one of wireless beacons 130 transmitting the request. In other embodiments, the request and/or connection may utilize near field communication, radio communication, infrared communication, or Bluetooth communication. Additionally, although wireless beacons 130 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacons 130 (e.g., user device 110 and/or merchant device 140) and establishment of a connection for data transfers.

The request may be specific to user device 110 by including information that is specific to user 102, such as a name, identifier, or user device identifier. The information specific to user 102 may be determined from a user account of user 102 or other information previously provided to merchant device 140 and/or payment provider server 170. Thus, in certain embodiments, only merchant device 110 will pick up and authenticate the request. In other embodiments, user device 110 may only pick up the request based on the signal range and/or physical context for one of wireless beacons 130 transmitting the request within the sub-location. For example, one of wireless beacons 130 established in a sub-location of a merchant location and may be limited in range only to connect to user device 110 if user device 110 is located in the sub-location.

After check-in application 132 receives an identifier from user device 110, check-in application 132 may determine user 102 is in proximity to the wireless beacon of wireless beacons 130 receiving user 102's identifier. Thus, merchant device 140 may determine a sub-location where user 102 is located through the connection between one or more of wireless beacons 130. Wireless beacons 130 may pass the identifier to payment provider server 170 to complete the check-in process. As shown in FIG. 1, wireless beacons 130 may utilize communication module 134 to pass the identifier to merchant device 140, which may then pass the identifier to payment provider server 150. However, in other embodiments, wireless beacons 130 may utilize a network connection of wireless beacons 130 to pass the identifier to payment provider server 170 directly. Additionally, check-in application 132 may cause wireless beacons 130 to keep a communication channel open between user device 110, merchant device 140, and/or payment provider server 170 for passing additional information, such as connection time between user device 110 and one or more of wireless beacons 130, expected checkout times, checkout lines/routes/lanes for user 102, etc.

In various embodiments, wireless beacons 130 includes at least one communication module 134 adapted to communicate with user device 110, merchant device 140, and/or payment provider server 170. Communication module 134 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 134 may communicate with user device 110 and/or merchant device 140 using short range communications, such as radio frequency, infrared, Bluetooth, and near field communications.

Merchant device 140 may be implemented using any appropriate hardware and software configured for wired and/or wireless communication with user device 110, wireless beacons 130, and/or payment provider server 170. For example, merchant device 140 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a merchant device is shown, the merchant device may be managed or controlled by any suitable processing device. Although only one merchant device is shown, a plurality of merchant devices may function similarly. Moreover, in various embodiments, one or more of the applications, processes, and/or features discussed below in reference to merchant device 140 may be included in payment provider server 170, and vice versa.

Merchant device 140 of FIG. 1 contains a beacon application 150, a line routing application 160, a sales application 142, other applications 144, a database 146, and a communication module 148. Beacon application 150, line routing application 160, sales application 142 and other applications 144 may correspond to processes, procedures, and/or applications executable by a hardware processor, for example, a software program. In other embodiments, merchant device 140 may include additional or different software as required.

Beacon application 150 may correspond to an application configured to monitor wireless beacons 130 and determine connectivity of wireless beacons 130 with user devices, such as user device 110. In this respect, beacon application 150 may receive and/or access connection information for connections between user device 110 and one or more of wireless beacons 130. As previously discussed, a connection between user device 110 and one or more of wireless beacons 130 may be formed when user device 110 is in proximity to one or more of wireless beacons 130 and receives a communication signal from the one or more of wireless beacons 130 in proximity to user device 110. In various embodiments, beacon application 150 may monitor and receive updates on the connection between user device 110 and a beacon of wireless beacons 130 connected to user device 110 after establishing the communication channel or connection However, in other embodiments, beacon application 150 may correspond to processes to complete a check-in with user device 110 for a merchant location corresponding to merchant device 140 (e.g., with one or more of wireless beacons 130 established in sub-locations and/or a merchant location for the merchant of merchant device 140). Thus, beacon application 150 may correspond to the merchant device side application configured to receive check-in info nation (e.g., user account information and/or an identifier for user 102) from user device 110 and complete the check-in. The check-in request may include log in information for a user account with merchant device 140 and/or payment provider server 170 and thus complete the check-in with user 102 by verifying the account information. For example, the check-in information may include an identifier or other account information for a user/payment account of user 102. However, in embodiments where a user account has not been previously established by user 102, beacon application 150 may receive other information identifying user 102 and/or the merchant, including a user name/identifier, user device identifier, an identifier for an account with another entity, or other information.

Beacon application 150 may determine the sub-location visited by user 102 using the connection(s) between user device 110 and one or more of wireless beacons. Moreover, beacon application 150 may further determine an amount of time spent by user 102 in the sub-location by determining an amount of time of existence of the connection between user device 110 and one or more of wireless beacons 130. For example, user 102 may be determined to be located in a produce sub-location of a grocery store for 10 minutes if the connection between user device 110 and a wireless beacon of wireless beacons 130 established in the produce section exists for 10 minutes. At the end of the 10 minutes if user 102 walks out of the produce section and user device 110 can no longer connect to the wireless beacon established in the produce section, then beacon application 150 may determine user 102 is no longer in the produce section. Moreover, beacon application 150 may track user 102's movements throughout the merchant location by receiving and/or accessing information on which of wireless beacons 130 that user device 110 connects with and how long the stay in connection to those wireless beacons.

Once check-in is completed between user device 110 and wireless beacons 130, line routing application 160 may be utilized to determine a line, lane, or route for checkout for user 102 that may optimize both a checkout time for user 102 and a throughput or traffic flow for all users checking out at the merchant location. For example, line routing application 160 may determine a line for user 102 that may complete checkout fastest for user 102. Additionally, line routing application 160 may also determine a line for user 102 to optimize each checkout line at the merchant location so that each user may complete checkout quickly based on the items/services for purchase by each user. Thus, optimization of the checkout lines may focus on the fastest throughput or traffic for each checkout line at the merchant location so that one checkout line does not take considerably longer than another checkout line. In this regard, line routing application 160 may receive information from beacon application 150 and process the information to determine an expected checkout time for user 102. Information received from beacon application 150 may correspond to movement/location/time tracking information for user 102, such as sub-locations within the merchant location that user 102 visited, amount of time spent in the sub-locations, and/or actions taken in the sub-locations (e.g., scanned items using a camera or scanning function of user device 110, item lookups using a browse/search feature of user device 110, merchant service requests in the sub-location, etc.).

Line routing application 160 may processes the information received from beacon application 150 to make assumptions, determinations, and/or intelligent decisions as to the amount and/or type of item(s)/service(s) that user 102 is purchasing. For example, if user 102 spends 1 minute in a produce section or a music section of a store, line routing application 160 may determine user 102 is only purchasing a single item or small number of items. Conversely, if user 102 spends 10-15 minutes in a produce section, or 30+ minutes in a music section, line routing application 160 may determine that user 102 may be purchasing a number of items. Additionally, user 102 may take actions in those sections, such as scanning items using user device 110 to determine a price or looking up items to determine sales at other stores or online, which may affect line routing application 160's determination of items for purchase by user 102. Based on the number of items that user 102 may purchase, line routing application 160 may determine how long user 102 may take to complete a checkout at the merchant location for merchant device 140. Thus, if user 102 spends 15 minutes in a produce section and may be purchasing several items of produce, it may take user 102 longer (e.g., 3-5 minutes) to checkout than if user 102 spends 1 minute in the produce section and may only be purchasing a single item (e.g., 1 minute).

Moreover, a type of item for purchase may also affect the expected checkout time for user 102. Whereas a user shopping for media in a department store may take 1 minute to pay for a single CD or DVD, a user shopping in the television or computer section of the department store may take noticeably longer (e.g., 10-20 minutes). For example, a user paying for a DVD may provide cash or payment card that quickly completes a checkout. Conversely, a person purchasing a $1,000 television or computer may wish to negotiate warranties, split payment between accounts, inquire into credit extended by the store and/or payment plans and potentially utilize such offers, and/or present coupons or other discounts. Thus, line routing application 160 may determine expected items for purchase by user 102, which may affected an expected checkout time for user 102.

A payment instrument for use by user 102 may also affect the expected checkout time determine by line routing application 160. For example, utilizing cash, payment card, and/or payment account with a payment provider may be quick when completing a payment. For example, cash may only take 30 seconds to accept and provide change, while a payment card may only take 10 seconds to scan and sign a receipt. Conversely, utilizing a check may take 1-2 minutes to fill out the check, having it scanned, and accept identification to prevent fraud and/or insufficient account funds (e.g., the check bouncing). Moreover, in high cost items, payment plans and/or credit lines may be extended to user 102, such as in the above television/computer example. Thus, in order to assess user 102's credit worthiness, complete a credit check, fill out credit/payment plan forms, and complete the transaction, the merchant for merchant device 140 may require 10-20 minutes or more. Therefore, an expected checkout time may be affected by the payment instrument selected by user 102. The payment instrument may be determined based on past transactions by user 102, past transactions by user 102 with the merchant for merchant device 140, and/or a selected payment instrument by user 102 using user device 110.

The expected checkout time for user 102 may also be determined using past transactions for user 102. Merchant device 140 and/or other merchant device for other merchants may time user 102 while completing checkout. The time for user 102 to actually complete checkout may be stored and may affect the expected checkout time for user 102. Thus, if user 102 always takes 2 minutes to complete a transaction for 5 items, or always takes 1 minute to complete a transaction for apples, merchant device 140 may adjust the expected checkout time using such information. The actual checkout time(s) for user 102 may also be compared to an average checkout time for the same or similar items/service by other users to determine if user 102 takes shorter or longer than other users. Thus, the expected checkout time may also be affected by this comparison.

As previously discussed, line routing application 160 may transmit the determined information for user 102 to user device 110 for review by user 102. Thus, user 102 may view predicted items/services for purchase by user 102, a payment instrument for transaction processing and payment determined for user 102, and/or an expected checkout time for user 102. If user 102 is not purchasing listed items/services, is purchasing additional items/service, or is utilizing another payment method, user 102 may change the information using user device 110, which may update and affect the expected checkout time determined by line routing application 160. However, if user 102 changes the items/services, numbers, and/or payment instrument fraudulently (e.g., is actually purchasing items that were removed from the predicted items for purchase by user 102), line routing application may limit or prevent user 102 from making such changes in the future.

Once an expected checkout time is determined for user 102, line routing application 160 may determine a line, lane, or route for checkout by user 102. A merchant location may include a plurality of checkout lines, each having none, one, or more users in the line and checking out/paying for items/services with the merchant. Line routing application 160 may determine an estimated or actual wait time for each line, for example, using the expected checkout times for each user in the line, the lines throughput/traffic, or other information about the checkout line. Thus, line routing application 160 may inform user 102 of which line to enter in order to checkout based on the checkout lines information and the expected checkout time for user 102. The line for user 102 may be based on which line will most quickly complete a checkout for user 102 by routing user 102 to a line that has the shortest wait. However, line routing application 160 may also optimize each line to decrease wait and/or traffic time for all users by routing user 102 to a line that optimizes all users checkout times at the merchant location. Thus, if user 102 is expected to take 20 minutes to checkout, user 102 may be routed to a line that is 10 minutes long even if another line that is 5 minutes long is available. Thus, user 102 will not sharply increase the time in a short line that can be user by line routing application 160 to direct other users with short expected checkout times. Therefore, if there are a large number of users with short expected checkout times and user 102 is the only or one of a few users with large checkout times, line routing application 160 may route user 102 to the longer line so that traffic through the short line may continue flowing quickly. However, if line routing application 160 does not expect other users to enter the short checkout line, user 102 may be routed to the short checkout line even if user 102 is expected to take noticeably longer to complete a checkout.

Line routing application 160 may present the determined checkout line to user 102 through user device 110. In order to prevent user 102 from visiting an incorrect line or otherwise abusing the line system, line routing application 160 may require a connection and/or check-in with user device 110 and/or a wireless beacon of wireless beacons 130 established in the checkout line. For example, a checkout line may include a wireless beacon of wireless beacons 130 that connects to user device 110 and alerts user 102 that they are in the correct line. The merchant for merchant device 140 may also be alerted so that the merchant is aware that user 102 is in the correct line. If user 102 is in the incorrect line, user 102 and/or the merchant may be alerted. In various embodiments, line routing application 160 may display a map for the checkout lines to user 102 with the correct checkout line. In other embodiments, a number, identifier, or other information may be presented to user 102 on user device 110 that may be shown to a merchant or line administrator so that user 102 is placed in the correct checkout line.

Sales application 142 may be used, for example, to provide a convenient interface to permit a merchant for merchant device 140 to enter, view, and/or process items/services user 102 wishes to purchase. For example, sales application 142 may be implemented as an application having a user interface enabling the merchant to enter the items/services user 102 has selected for purchase (e.g., through input by the merchant and/or user 102, scanning the items/services, etc.). Sales application 142 may further enable the merchant to view the items/services for purchase by user 102, enter coupons and/or discounts for the items/services, edit the order including adding, removing, and/or modifying items/services, or other functions with regards the selected items/services. Once the items/services have been arranged into an order for purchase by user 102, a total may be calculated and a transaction may be engaged with user 102 to complete payment for the selected items/services.

Sales application 142 may request payment covering the selected items/service from user 102. Thus, sales application 142 may receive a payment instrument from user 102 to complete a transaction for the selected items/services. The payment instrument may correspond to cash, payment cards, checks, and/or payment accounts with payment provider server 170, in various embodiments. Once a transaction is processed and/or completed by sales application 142 for the selected items/services by user 102, a transaction history (e.g., receipt) may be generated and provided to one or more of user 102, user device 110, and/or payment provider server 170. Additionally, sales application 142 may time, calculate, or otherwise determine an amount of time that user 102 requires to checkout with merchant device 140. For example, the amount of time may correspond to an actual amount of time from the beginning of the transaction between user 102 and merchant device 140 to the end of the transaction. The beginning of the transaction may correspond to a time a first item/service selected by user 102 is entered to sales application 142 or another starting point, such as initiating payment. The end of the transaction may be determined to be when user 102 provides a payment instrument to merchant device 140, a payment for the selected items/services is processed or completed, and/or when user 102 leaves a checkout line/route at the merchant location for merchant device 140. The amount of time required by user 102 to checkout with merchant device 140 may be provided in the transaction history. Furthermore, the payment instrument utilized by user 102 and the amount of time may be utilized by line routing application 142 to determine an expected checkout time for user 102, as previously discussed.

Merchant device 140 includes other applications 144 as may be desired in particular embodiments to provide features to merchant device 140. For example, other applications 144 may include security applications for implementing client-side security features, programmatic client applications for interfacing with appropriate application programming interfaces (APIs) over network 180, or other types of applications. In various embodiments, other applications 144 may include financial applications, such as banking, online payments, money transfer, or other applications associated with payment provider server 170. Other applications 144 may contain other software programs, executable by a processor, including a graphical user interface (GUI) configured to provide an interface to the user.

Merchant device 140 may further include database 146 which may include, for example, identifiers such as operating system registry entries, cookies associated with beacon application 150, line routing application 160, sales application 142, and/or other applications 144, identifiers associated with hardware of merchant device 140, or other appropriate identifiers, such as identifiers used for payment/user/device authentication or identification. In one embodiment, identifiers in database 146 may be used by payment provider server 170 to associate merchant device 140 with a particular account maintained by payment provider server 170. Database 146 may also store user 102's information, including check-in information, an identifier, etc., for user 102. Database 146 may include payment instruments, past transaction histories, expected checkout times, and/or other past information for user 102. Information about checkout lines at a merchant location corresponding to merchant device 140 may also be stored to database 146, such as current wait times, estimated wait times, traffic flow, or other statistic that may affect a user's expected checkout time in a line or the lines throughput.

Merchant device 140 includes at least one communication module 148 adapted to communicate with user device 110, wireless beacons 130, and/or payment provider server 170. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with wireless beacons 130 using short range communications, such as Bluetooth Low Energy, LTE Direct, radio frequency, infrared, Bluetooth, and near field communications.

Payment provider server 170 may be maintained, for example, by an online payment service provider, which may provide payment services and/or processing for financial transactions on behalf of a user. In this regard, payment provider server 170 includes one or more processing applications which may be configured to interact with user device 110, wireless beacons 130, and/or merchant device 140 to facilitate payment for a transaction. In one example, payment provider server 170 may be provided by PAYPAL®, Inc. of San Jose, Calif., USA. However, in other embodiments, payment provider server 170 may be maintained by or include a credit provider, financial services provider, financial data provider, and/or other service provider, which may provide payment services to user 102 and/or the merchant. Moreover, in various embodiments, one or more of the applications, processes, and/or features discussed below in reference to payment provider server 170 may be included in merchant device 140, and vice versa.

Payment provider server 170 of FIG. 1 includes a transaction processing application 172, other applications 174, a database 176, and a network interface component 178. Transaction processing application 172 and other applications 174 may correspond to processes, procedures, and/or applications executable by a hardware processor, for example, a software program. In other embodiments, payment provider server 170 may include additional or different software as required, such as a check-in application and/or a monitoring application as discussed in reference to merchant device 140, where those features are instead provided by payment provider server 170.

Transaction processing application 172 may be configured to receive information from and/or transmit information to user device 110 and/or merchant device 140 for processing and completion of financial transactions. Transaction processing application 172 may include one or more applications to process financial transaction information from user 102 and merchant for merchant device 140 by receiving a request to complete transaction for items and/or services offered by the merchant. The request may correspond to a payment from user 102 to the merchant. The payment may include a user account identifier or other payment information (e.g. a credit/debit card or checking account) for user 102 and a receiving account for the merchant. Additionally, the payment may include a payment amount and terms of payment. Transaction processing application 172 may complete the transaction by providing payment to the merchant through the receiving account/payment information. Additionally, transaction processing application 172 may provide transaction histories, including receipts, to user device 110 and/or merchant device 140 for completion and documentation of the financial transaction. For example, a transaction history may be provided to user device 110 and/or merchant device 140 to allow for the merchant to view the transaction and provide the items and/or services to user 102.

In various embodiments, payment provider server 170 includes other applications 174 as may be desired in particular embodiments to provide features to payment provider server 170. For example, other applications 174 may include security applications for implementing server-side security features, programmatic server applications for interfacing with appropriate application programming interfaces (APIs) over network 180, or other types of applications. Other applications 174 may contain software programs, executable by a processor, including a graphical user interface (GUI), configured to provide an interface to a user.

Additionally, payment provider server 170 includes database 176. As previously discussed, user 102 and/or the merchant may establish one or more payment accounts with payment provider server 170. User accounts in database 176 may include merchant/user information, such as name, address, birthdate, payment/funding information, additional user financial information, and/or other desired user data. User 102 and/or the merchant may link to their respective payment accounts through a user, merchant, and/or device identifier. Thus, when an identifier is transmitted to payment provider server 170, e.g. from user device 110 and/or merchant device 140, a payment account belonging to user 102 and/or the merchant may be found. In other embodiments, user 102 and/or the merchant may not have previously established a payment account and may provide other financial information to payment provider server 170 to complete financial transactions, as previously discussed.

In various embodiments, payment provider server 170 includes at least one network interface component 178 adapted to communicate user device 110, wireless beacons 130, and/or merchant device 140 over network 180. In various embodiments, network interface component 178 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 180 may be implemented as a single network or a combination of multiple networks. For example, in various embodiments, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figure 2A:
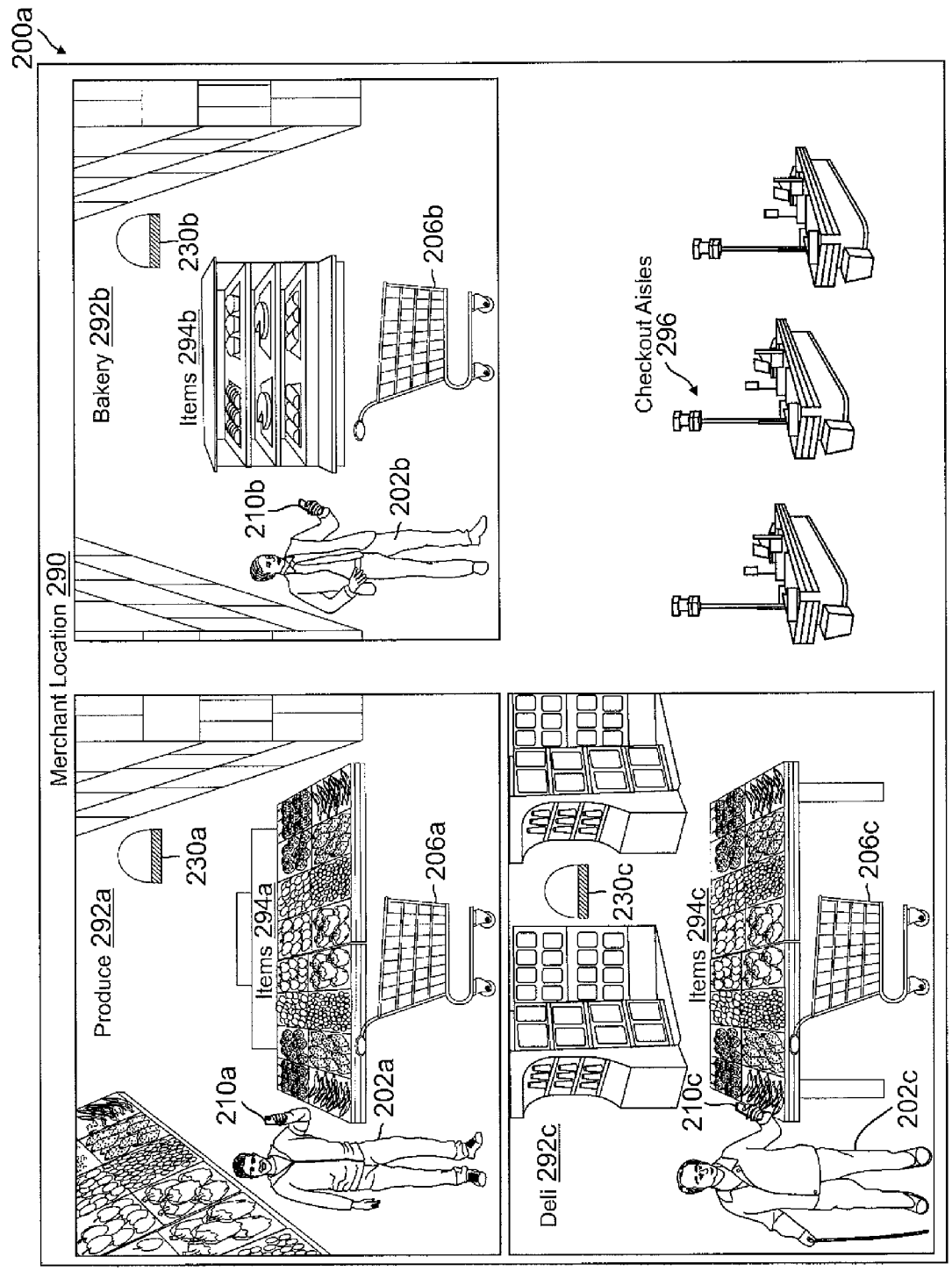
FIG. 2A is an exemplary merchant location environment with users monitored using wireless beacons at various sub-locations within a merchant location, according to an embodiment.

FIG. 2A is an exemplary merchant location environment with users monitored using wireless beacons at various sub-locations within a merchant location, according to an embodiment. Environment 200a of FIG. 2 includes a user 202a utilizing a user device 210a, a user 202b utilizing a user device 210, and a user 202c utilizing a user device 210c all corresponding generally to user 102 utilizing user device 110, respectively, of FIG. 1. Moreover, environment 200a includes a wireless beacon 230a, a wireless beacon 230b, and a wireless beacon 230c corresponding generally to wireless beacons 130 of FIG. 1.

Shown in environment 200a are sub-locations within a merchant location 290. Merchant location 290 may correspond to a shopping market or grocery store where users 202a, 202b, and 202c may purchase food and other goods. Thus, merchant location 290 includes at least 3 sub-locations, shown as produce 292a, bakery 292b, and deli 292c. The sub-locations may correspond to an area of merchant location 290 where users 202a, 202b, and 202c may select an type of item for purchase, such as fruits and vegetables in produce 292a, cakes, pastries, and breads in bakery 292b, and salads, sandwiches, and meats in deli 292c. Moreover, as shown in environment 200a, produce 292a is monitored by wireless beacon 230a, bakery 292b is monitored by wireless beacon 230b, and deli 292c is monitored by wireless beacons 230c.

When user 202a visits produce 292a in order to purchase items 294a (e.g., fruits and/or vegetables), user device 210a may connect to wireless beacon 230a. Similarly, when user 202b enters bakery 292b, user device 210b may connect to wireless beacon 230b and when user 202c enter deli 292c, user device 210e may connect to wireless beacons 230c. Based on the connect between user device 210a, 210b, and 210c with wireless beacons 230a, 230b, and 230c, respectively, a merchant device (not shown) may determine each user has selected items for purchase from the corresponding area. Thus, the merchant device may determine user 202a has placed one or more of items 294a into cart 206a. Similarly, user 202b may place one or more of items 294b into cart 206b, and user 202c may place one or more items into cart 206c.

In various embodiments, cart 206a, 206b, and/or 206c may include various hardware and/or software to detect if items have been placed into cart 206a, 206b, and/or 206c, and/or determine what items user 202a, 202b, and/or 202c have placed into cart 206a, 206b, and/or 206c, respectively. For example, cart 206a, 206b, and/or 206c may include scales, scanners, sensors, or other hardware and/or software to detect items placed into each respective cart. Moreover, based on the amount of time user device 210a, 210b, and/or 210c spends connected to wireless beacon 230a, 230b, and/or 230c, the merchant device may determine what and/or how many items are placed into cart 206a, 206b, and/or 206c. Once user 202a leaves produce 292a, user device 210a may disconnect from wireless beacon 230a signifying user 202a has completed shopping in produce 292a. User devices 210b and 210c may function similarly with wireless beacons 230b and 230c. Furthermore, if prior to attending checkout aisles 296, users 202a, 202b, and/or 202c visit another sub-location, the merchant device may further determine users 202a, 202b, and/or 202c have further selected items for purchase in that area. For example, user 202a may visit bakery 292b after produce 292a and select one or more items 294b for purchase. Thus, based on a connection between user device 210a and wireless beacons 2306, the merchant device may determine user 202a has selected one or more of items 294b for purchase.

Figure 2B:
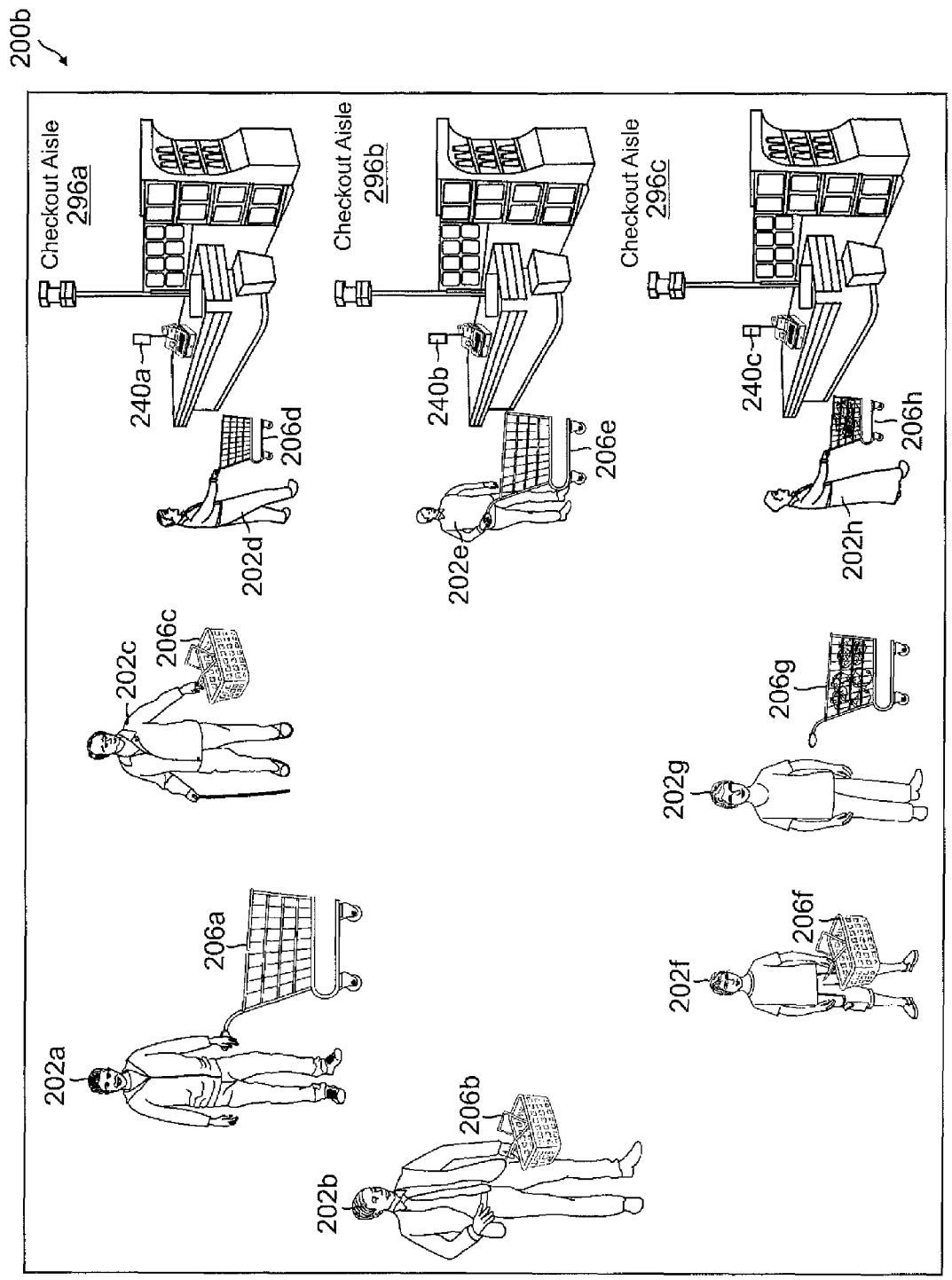
FIG. 2B is an exemplary merchant location environment displaying smart line routing using information about users determined from wireless beacons at the merchant location, according to an embodiment.

FIG. 2B is an exemplary merchant location environment displaying smart line routing using information about users determined from wireless beacons at the merchant location, according to an embodiment. Environment 200b of FIG. 2B includes a user 202a, a user 202b, a user 202c, a user 202d, a user 202e, a user 202f, a user 202g, and a user 202h all corresponding generally to user 102 of FIG. 1. Additionally, environment 200b includes a merchant device 240a, a merchant device 240b, and a merchant device 240c all corresponding generally to merchant device 140 of FIG. 1.

In environment 200b, user 202a and user 202b at a merchant location 290 are ready to check out. User 202a has a cart 206a filled with items for purchase at merchant location 290 while user 202b has a basket with a few items for purchase at merchant location 290. Furthermore, a checkout aisle 296a, a checkout aisle 296b, and a checkout aisle 296c include users ready to checkout and finish a transaction with merchant device 240a, merchant device 240b, and merchant device 240c, in checkout aisle 296a, checkout aisle 296b, and checkout aisle 296c, respectively.

A merchant device, such as one or more of merchant device 240a, 240b, and/or 240c, or a merchant server or other network device for merchant location 290, may determine items in cart 206a and basket 206b based on sub-locations user 202a and user 202b has visited in merchant location 290, time spent by user 202a and 202b in those sub-locations, actions taken by user 202a and 202b in those sub-locations, and/or sensors or other information captured by cart 206a and/or 206b. For example, as shown in FIG. 2A, user 202a may have visited a produce section and/or other sub-locations at merchant location 290. Thus, the merchant device may determine an expected checkout time for user 202a and 202b using the information, as previously discussed.

The merchant device may further determine a wait time for each of checkout aisle 296a, 296b, and 296c. For example, it is shown in environment 200b that user 202c has a basket 206c and user 202d has a cart 206d. Based on the expected checkout times determined for user 202c and user 202d, checkout aisle 296a may have a first wait time. Similarly, checkout aisle 296b includes a user 202e with a cart 206e. User 202e may have an expected checkout time based on the items in cart 206e that affects a second wait time for checkout aisle 296b. Additionally, checkout aisle 296c includes user 202f with a basket 206f, user 202g with an item 206g, and user 202h with an item 206h. Based on the expected checkout times for user 202f, 202g, and 202h, checkout aisle 296c may have a third wait time.

Based on the first wait time, the second wait time, and the third wait time with the expected checkout times for users 202a and 202b, user 202a and 202b may be directed to one of checkout aisle 296a, 296b, and 296c. For example, checkout aisle 296b only has user 202e waiting in line. Thus, the second wait time for checkout aisle 296b may be relatively short so that both user 202a and 202b are directed to checkout aisle 296b based on the few users in checkout aisle 296b. However, in another embodiment, cart 206e may include a large amount of items, such as a full shopping cart at a grocery store with 50+ items for purchase. Thus, the second wait time for checkout aisle 296b may be longer than checkout aisle 296c where users 202g and user 202h only have a single item or a couple items in carts 202g and 202h, respectively, and user 202f has a small basket of items in basket 206f. In such an embodiment, users 202a and 202b may instead be directed to checkout aisle 296c.

In other embodiments, the merchant device routing users to checkout aisles in environment 200b may also determine the lines users 202a and 202b are directed to using traffic flow for each of checkout aisles 296a, 296b, and 296c. For example, user 202a may also have cart 206a full of items for purchase, causing the expected checkout time for user 202a to be long. Thus, user 202a may be directed to checkout aisle 296b to keep traffic flowing through checkout aisle 296a and 296c. Similarly, if user 202b has only a couple items in basket 206b, user 202b may be directed to checkout aisle 296c where traffic is flowing quickly. However, if more items are in basket 206b so that user 202b may take an intermediate amount of time to checkout, user 202b may be directed to checkout aisle 296a where user 202c has a basket 206c of goods and user 202d has a cart 206d of goods. Thus, traffic may also be optimized to insure proper flow through checkout aisles 296a, 296b, and 206c.

Figure 3:
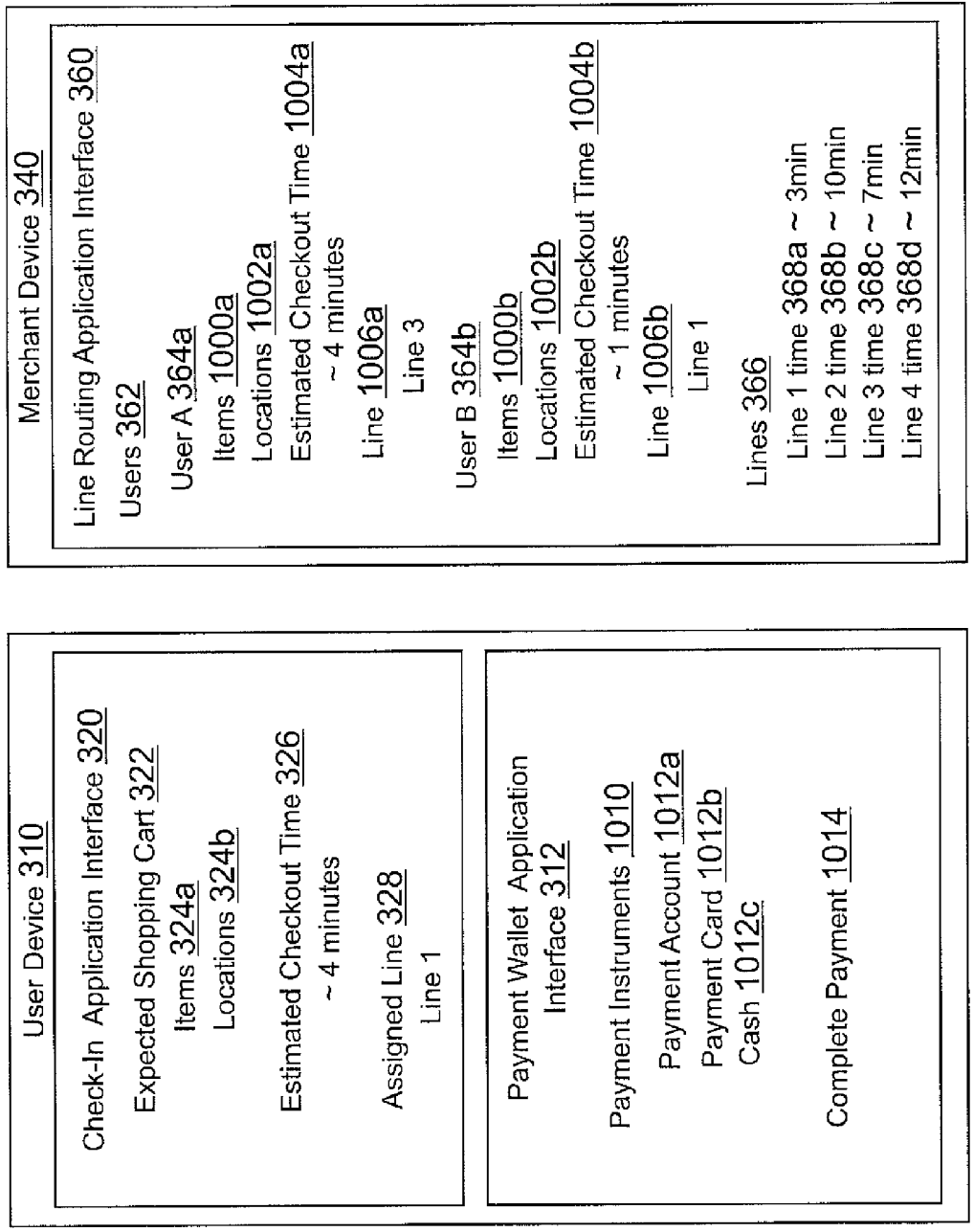
FIG. 3 is an exemplary system environment showing display screens of a user device and a merchant device for smart line routing using wireless beacons, according to an embodiment.

FIG. 3 is an exemplary system environment showing display screens of a user device and a merchant device for smart line routing using wireless beacons, according to an embodiment. Environment 300 includes a user device 310, a wireless beacon 330, and a merchant device 340 corresponding generally to user device 110, wireless beacon 330, and merchant device 140, respectively, of FIG. 1.

User device 310 displays a check-in application interface 320 corresponding generally to the processes and features described in reference to check-in application 120 of FIG. 1. Check-in application interface 320 may display information for a checkout line, lane, or route that a user (not shown) of user device 310 may utilize to complete a checkout. The checkout line may be optimized for the user, as previously discussed. Thus, a merchant device 340 includes a line routing application interface 360 corresponding generally to the processes and features described in reference to line routing application 160 of FIG. 1. Line routing application interface 360 may be displayed to a merchant or merchant employee (e.g., a checkout clerk) for viewing and input by the merchant. However, in other implementation, the line routing application may execute in a background of merchant device 340 and be configured to determine expected checkout times for users and transmit checkout line routing to the users without merchant input.

Line routing application interface 360 includes users 362 correspond to the users connected to beacons at the merchant location. Thus, users 362 displays a user A 364a and a user B 364b. Under user A 364a is information about a user A including items 1000a, locations 1002a, an estimated checkout time 1004a, and a line 1006a. Items 1000a may correspond to predicted items that user A 364a may purchase based on input from the wireless beacons established throughout a merchant location, as previously discussed. Such information in items 1000a may be influenced by locations 1002a that user A 364a has visited. Thus, locations 1002a may be determined based on the connections between a device of user A 364a and wireless beacons at those locations. Using items 1000a and locations 1002a, merchant device 340 may determine estimated checkout time 1004, shown as 4 minutes in FIG. 3. Similarly, merchant device 340 may determine an estimated checkout time 1004b using items 1000b and locations 1002b for user B 364b. Thus, estimated checkout time 1004b is shown as 1 minute in FIG. 3.

Merchant device 340 may further include information about lines 366. Lines 366 may therefore include an estimated or actual wait time for each like. Thus, a line 1 time 368a is shown as 3 minutes, a line 2 time 368b is shown as 10 minutes, a line 3 time 368c is shown as 7 minutes, and a line 4 time 368d is shown as 12 minutes. Merchant device 340 may utilize the times under lines 366 to determine line 1006a and line 1006b for user A 364a and user B 364b, respectively. Thus, by processing the information together, merchant device 340 is shown to determine line 3 for user A 364a and line 1 for user B 364b.

Based on the information about what items/services the user of user device 310 may purchase, an expected shopping cart 322 may be displayed to the user in check-in application interface 320. Expected shopping cart 322 includes items 324a having predicted, determined, or received items for purchase by the user. Items 324a may include items predicted based on locations 324b that the user is determined to have visited in a merchant location. Additionally, the user may enter, edit, and/or remove items/services from items 324a, as previously discussed. Using the expected shopping cart 322, an estimated checkout time 326 is displayed to the user, shown as 4 minutes in. FIG. 3. Further, an assigned line 328, line 1, is also displayed to the user.

User device 310 also displays a payment wallet application interface 312 corresponding generally to the processes and features described in reference to payment wallet application 112 of FIG. 1. Payment wallet application interface 312 includes payment instruments 1010 having payment instruments the user of user device 310 may utilize to process and complete a transaction with merchant device 340. Furthermore, a selected payment instrument under payment instruments 1010 may also affect estimated checkout time 1004a/1004b determined by merchant device 340 and estimated checkout time 326 displayed to the user. Thus, the user may select one or more of payment account 1012a, payment card 1012b, and/or cash 1012c. One or more of payment account 1012a, payment card 1012b, and/or cash 1012c may also already be selected under payment instruments 1010 based on past transactions by the user. Furthermore, if the information for payment instruments 1010 is stored to user device 310 or accessible by user device 310 and/or merchant device 340, the user may select a complete payment 1014 process to complete the payment with merchant device 340.

Figure 4:
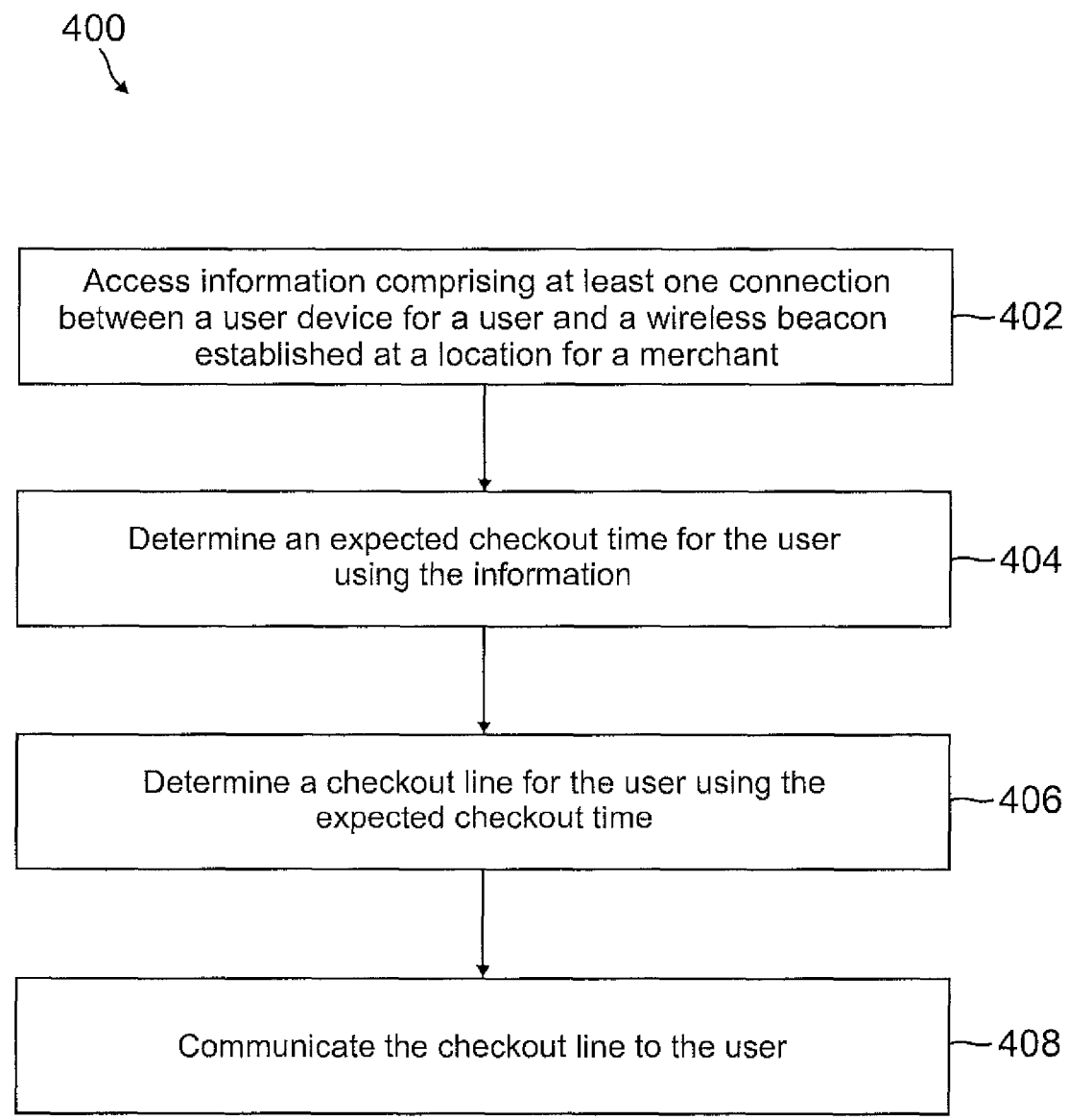
FIG. 4 is a flowchart of an exemplary process for smart line routing using wireless beacons, according to an embodiment.

FIG. 4 is a flowchart of an exemplary process for smart line routing using wireless beacons, according to an embodiment. Note that one or more steps, processes, and methods described herein may be omitted, performed in a different sequence, or combined as desired or appropriate.

At step 402, information comprising at least one connection between a user device for a user and a wireless beacon established at a location for a merchant is accessed. The information may correspond to user tracking information between a user device and at least one wireless beacon at a merchant location. The connection may utilize one of near field communication, radio communication, infrared communication, Bluetooth communication, Bluetooth Low Energy (BLE) communication, LTE Direct communication, and WiFi communication. The user tracking information may further comprise an amount of time for the at least one connection between the user device and the at least one wireless beacon. Further, the wireless beacon may be established at a sub-location at the merchant location, and a plurality of other wireless beacons may each be established at other sub-location at the merchant location.

An expected checkout time for the user is determined using the information, at step 404. A sub-location with a wireless beacon may include items, services and/or sales available at the sub-location. Thus, the expected checkout time may be further determined using the type of item, service, or sales available at the sub-location. The expected checkout time may also be further determined using an amount of time spent at the sub-location. In various embodiments, a past checkout time, a transaction history, and/or at least one past used payment instrument for the user may be accessed, where the expected checkout time is further determined using the aforementioned accessed information. For example, a transaction history may comprise items or services previously purchased with the merchant that may affect the expected checkout time. In other embodiments, the past checkout time may comprise an average time to complete a checkout for items or services with the merchant from past transactions by the user with the merchant.

At step 406, a checkout line for the user may be determined using the expected checkout time. In various embodiments, at least one item or service for purchase by the user may be determined using the connection. Thus, the expected checkout time and the checkout line may be determined using the at least one item or service. In various embodiments, another user may presently be waiting in one of a plurality of checkout lines, such as the checkout line determined using the expected checkout time. Thus, an expected checkout time for the other user may be determined, which may affect the determination of which of the plurality of checkout lines to route the first user. The checkout line is communicated to the user, at step 408. In various embodiments, the information determined about the user from the connection may be communicated to the user with the expected checkout time. Thus, a change to at least one of the information and the expected checkout time for the user may be received, and another checkout line may be determine and communicated to the user using the change. Moreover, the expected checkout time for the user and the checkout line communicated to the user may affect subsequent users. Thus, when subsequent users are routed to checkout lines, the amount of time the user may spend in the checkout line may affect the routing the subsequent users to certain checkout lines.

Figure 5:
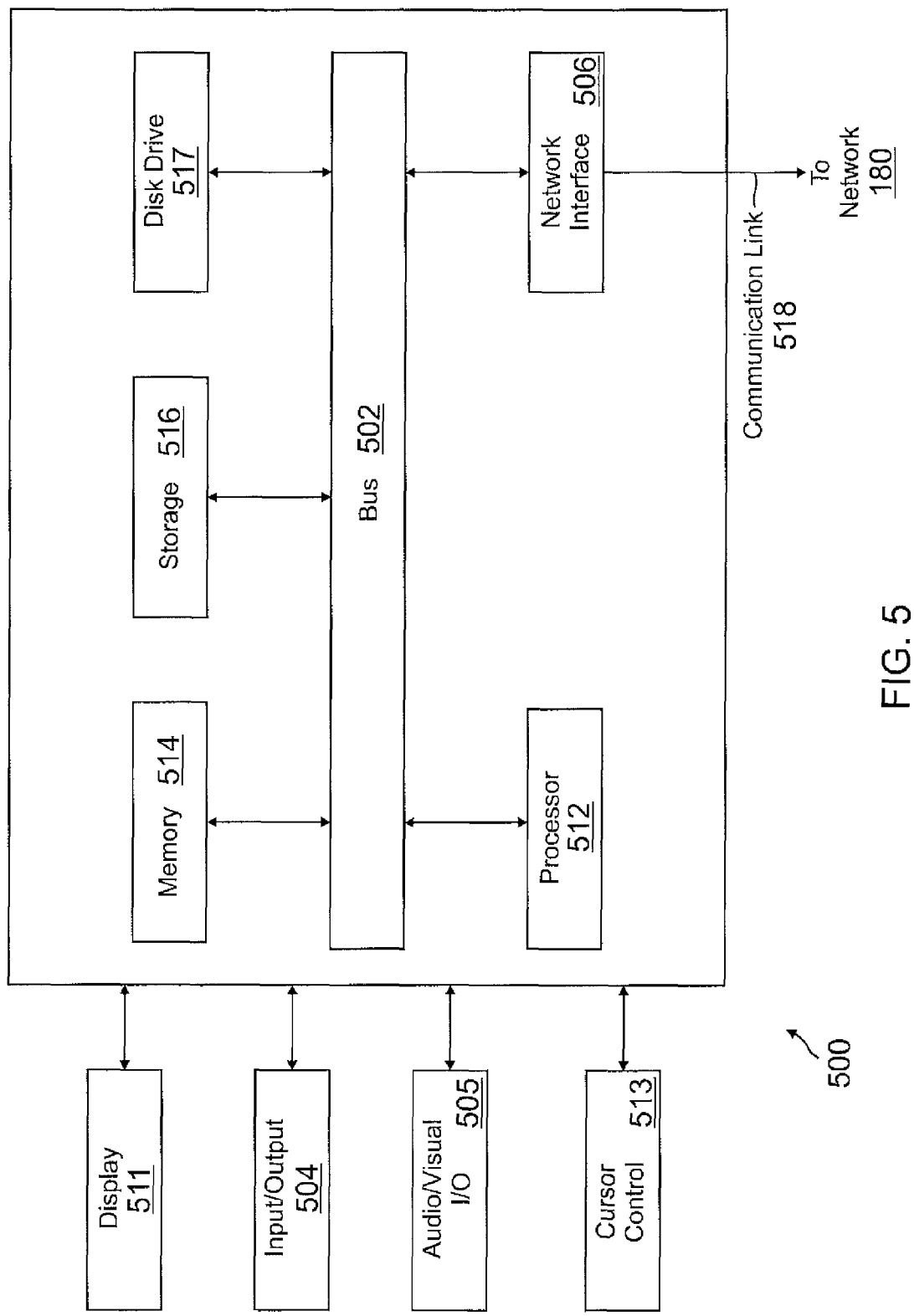
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio 110 component 505 may allow the user to hear audio. A transceiver or network interface 506 transmits and receives signals between computer system 500 and other devices, such as another user device, service device, or a service provider server via network 180. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing user tracking information for a user; and
one or more hardware processors in communication with the non-transitory memory and configured to:
access the user tracking information comprising at least one connection between a user device for the user and at least one wireless beacon of a plurality of wireless beacons in a merchant location for a merchant, wherein the merchant location corresponds to a single location where the merchant sells a plurality of items, and wherein the plurality of wireless beacons are located within the single location comprising the merchant location;
determine an expected checkout time for the user using the user tracking information based on at least one item the user has selected for purchase from the plurality of items available at the merchant location;
determine a first checkout line from a plurality of checkout lines at the merchant location for the user using the expected checkout time and a current wait time for each of the plurality of checkout lines; and
communicate the first checkout line to the user.

2. The system of claim 1, wherein the device and the at least one wireless beacon connect using one of near field communication, radio communication, infrared communication, Bluetooth communication, Bluetooth Low Energy (BLE) communication, LTE Direct communication, and WiFi communication.

3. The system of claim 1, wherein the user tracking information further comprises an amount of time for the at least one connection between the user device and the at least one wireless beacon.

4. The system of claim 1, wherein the at least one wireless beacon is established at a sub-location in the merchant location.

5. The system of claim 4, wherein the sub-location corresponds to a type of item, service, or sales available at the sub-location, and wherein the expected checkout time is further determined using the type of item, service, or sales available at the sub-location.

6. The system of claim 4, wherein the expected checkout time is further determined using an amount of time spent at the sub-location.

7. The system of claim 1, wherein prior to the one or more hardware processors determining the first checkout line, the one or more hardware processors are further configured to:
determine at least one previous checkout time for at least one previous user at the merchant location,
wherein the first checkout line is further determined using the at least one previous checkout time.

8. The system of claim 1, wherein the one or more hardware processors are further configured to:
communicate the user tracking information and the expected checkout time to the user;
receive a change to at least one of the user tracking information and the expected checkout time from the user;
determine a second checkout line for the user using the change to the user tracking information and the expected checkout time; and
communicate the second checkout line to the user.

9. A method comprising:
accessing shopping information for a first user, wherein the shopping information comprises connections between a user device for the first user and each of a plurality of wireless beacons established at sub-locations within a location for a merchant, wherein the location corresponds to a single location where the merchant sells a plurality of items, and wherein the plurality of wireless beacons are located within the single location comprising the location;
determining at least one item the user has selected for purchase from the plurality of items available at the location;
determining a first expected checkout time for the first user based on the shopping information and the at least one item the user has selected for purchase;
determining, using one or more hardware processors, a checkout route for the first user of a plurality of checkout routes at the location using the first expected checkout time and a wait time to traverse each of the plurality of checkout routes; and
communicating the checkout route to the first user.

10. The method of claim 9 further comprising:
receiving an indicated payment instrument for completing payment in the checkout route from the first user,
wherein the checkout route is further determined using the indicated payment instrument.

11. The method of claim 9 further comprising:
accessing at least one past used payment instrument for the first user,
wherein the checkout route is further determined using the at least one past used payment instrument.

12. The method of claim 9 further comprising:
accessing at least one transaction history for the first user with the merchant,
wherein the first expected checkout time is further determined using the at least one transaction history.

13. The method of claim 12, wherein the at least one transaction history comprises items or services previously purchased with the merchant.

14. The method of claim 9 further comprising:
accessing a past checkout time for the first user,
wherein the first expected checkout time is further determined using the past checkout time.

15. The method of claim 14, wherein the past checkout time comprises an average time to complete a checkout for items or services with the merchant from past transactions by the first user with the merchant.

16. The method of claim 9 further comprising:
determining at least one item or service for purchase by the first user using the connections,
wherein the first expected checkout time and the checkout route are further determined using the at least one item or service.

17. The method of claim 9, wherein prior to determining the checkout route for the first user, the method further comprises:
determining a second expected checkout time for a second user, wherein the second user is waiting in one of a plurality of checkout routes,
wherein the checkout route is further determined using the second expected checkout time.

18. A non-transitory computer-readable medium comprising instructions which, in response to execution by a computer system, cause the computer system to perform a method comprising:
determining expected purchasing information for a user based on at least one connection between a user device for the user and at least one wireless beacon of a plurality of wireless beacons established at a merchant location for a merchant, wherein the merchant location corresponds to a single location where the merchant sells a plurality of items, and wherein the plurality of wireless beacons are located within a single location comprising the merchant location;
determine an expected checkout time for the user from the expected purchasing information based on at least one item the user has selected for purchase from the plurality of items available at the merchant location;
determine a checkout line for the user from a plurality of checkout lines at the merchant location, wherein the checkout line is determined using the expected checkout time, a wait time for each of the plurality of checkout lines, and the expected purchasing information; and
communicate the checkout line to the user.

19. The non-transitory computer-readable medium of claim 18, wherein the at least one wireless beacon corresponds to a sub-location within the merchant location, wherein the sub-location includes items or services for sale from the merchant, and wherein the expected purchasing information is further determined using the items or services for sale from the merchant.

20. The non-transitory computer-readable medium of claim 18, wherein the at least one connection comprises an amount of connection time between the user device and the at least one wireless beacon, and wherein the expected purchasing information is determined suing the amount of connection time.

* * * * *